United States Patent
Vink et al.

(10) Patent No.: US 9,916,515 B2
(45) Date of Patent: Mar. 13, 2018

(54) IMAGE PROCESSING

(71) Applicant: KONINKLIJKE PHILIPS N.V., Eindhoven (NL)

(72) Inventors: Jelte Peter Vink, Waalre (NL); Marinus Bastiaan Van Leeuwen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 288 days.

(21) Appl. No.: 14/359,187

(22) PCT Filed: Nov. 7, 2012

(86) PCT No.: PCT/IB2012/056237
§ 371 (c)(1),
(2) Date: May 19, 2014

(87) PCT Pub. No.: WO2013/072816
PCT Pub. Date: May 23, 2013

(65) Prior Publication Data
US 2014/0334711 A1 Nov. 13, 2014

Related U.S. Application Data

(60) Provisional application No. 61/560,831, filed on Nov. 17, 2011.

(51) Int. Cl.
G06K 9/46 (2006.01)
G06T 7/00 (2017.01)
G06K 9/00 (2006.01)

(52) U.S. Cl.
CPC .......... G06K 9/46 (2013.01); G06K 9/00127 (2013.01); G06T 7/0012 (2013.01);
(Continued)

(58) Field of Classification Search
CPC .................. H04N 1/6027; H04N 1/407; G06T 2207/20144
See application file for complete search history.

(56) References Cited

U.S. PATENT DOCUMENTS 5,787,188 A 7/1998 Shih-Jong et al.
5,978,497 A 11/1999 Bannister et al.
(Continued)

FOREIGN PATENT DOCUMENTS

CN 101071474 A 11/2007
CN 102222318 A 10/2011
(Continued)

OTHER PUBLICATIONS

Macenko, M. et al "A method for normalizing histology slides for quantitative analysis" IDD Int. Synmposium on Biomedical Imaging 2009, pp. 1107-1110.
(Continued)

*Primary Examiner* — Stephen R Koziol
*Assistant Examiner* — Raphael Schwartz

(57) ABSTRACT

A system for processing an image comprises a region detector (1). The region detector comprises an artifact detector (7) for detecting a region comprising an artifact in the image. The system comprises a parameter determining unit (2) for determining a parameter, based on a portion of the image excluding the detected region. The system comprises an image processing module (3) for processing the image, using the derived parameter. The system comprises a display unit (5) for displaying the processed image with an indication of the detected region. The parameter determined by the parameter determining unit (2) can comprise a normalization parameter, and the image processing module (3) can be arranged for performing a normalization of the image according to the normalization parameter.

14 Claims, 3 Drawing Sheets

(52) U.S. Cl.
CPC ......... *G06K 2009/4666* (2013.01); *G06T 2207/20008* (2013.01); *G06T 2207/30004* (2013.01)

(56) References Cited

U.S. PATENT DOCUMENTS

| | | | |
|---|---|---|---|
| 6,137,899 | A | 10/2000 | Shih-Jong et al. |
| 7,263,241 | B2 | 8/2007 | Chingehun et al. |
| 7,551,721 | B2 | 6/2009 | Nakaura et al. |
| 8,472,709 | B2 | 6/2013 | Arcadia et al. |
| 8,787,634 | B2 | 7/2014 | Wiemker et al. |
| 8,897,601 | B2 | 11/2014 | Senda |
| 2006/0014238 | A1 | 1/2006 | Gholap et al. |
| 2008/0137937 | A1 | 6/2008 | Athelogou et al. |
| 2010/0111441 | A1* | 5/2010 | Xiong et al. .......... 382/275 |
| 2010/0266189 | A1 | 10/2010 | Knapp et al. |
| 2014/0334711 | A1 | 11/2014 | Vink et al. |

FOREIGN PATENT DOCUMENTS

| | | |
|---|---|---|
| EP | 0628186 B1 | 2/1993 |
| JP | 2008165496 A | 7/2008 |
| JP | 2009059326 A | 3/2009 |
| WO | 2010120318 A1 | 10/2010 |

OTHER PUBLICATIONS

McInnes, E. "Artifacts in histopathology". Comp Clin Path (2005) 13: 100-108.

Sun, Y. et al. "Autofocusing Algorithm Selection in Computer Microscopy". Intelligent Robots and Systems, IEEE/RSJ International Conference on Aug. 2-6, 2005, pp. 70-76.

Powell, M. et al. "A methodology for extracting objective color from images". IEE Transactions on Systems,Man and Cybernetics, Part :: Cybernetics, IEEE Service Center, NJ, vol. 34, No. 1, Oct. 1, 2004, pp. 1964-1978.

Foracchia, M. et al. "Luminosity and contrast normalization in retinal images". Medical Image Analysis, Ocford University Press, Oxford, GB, vol. 9, No. 3, Jun. 1, 2005, pp. 179-190.

Varga, M. et al. "An automated breast cancer grading demonstrator—Pathscore". in European Journal of Cancer Supplements, vol. 5(3)—Sep. 1, 2007.

Powell, M.W. "A Methodology for extracting objective color from images", IEEE Transactions on Systems, Man, and Cybernetics, Part B: Cybernetics, vol. 34, Issue 5, p. 1964-1978.

Foracchia, M. et al., "Luminosity and contrast normalization in retinal images", Medical Image Analysis, vol. 9, Issue 3, p. 179-190.

* cited by examiner

IMAGE PROCESSING

This application is a national stage application under 35 U.S.C. § 371 of International Application No. PCT/IB2012/056237 filed on Nov. 7, 2012 and published in the English language on May 23, 2013 as International Publication No. WO/2013/072816, which claims priority to U.S. Application No. 61/560,831 filed on Nov. 17, 2011, the entire disclosures of which are incorporated herein by reference.

FIELD OF THE INVENTION

The invention relates to image processing.

BACKGROUND OF THE INVENTION

In digital pathology, digital microscopic photographs are made of samples. The resulting digital images are then presented to a pathologist for evaluation. Digital pathology has several advantages compared to traditional pathology, in which samples are viewed directly through a microscope. First of all, digital pathology can increase the throughput. This becomes more and more relevant, since pathologists face increasing workloads. Secondly, digital pathology can provide means to improve the quality of the diagnosis. Studies indicate that the consistency of diagnoses by different pathologists can significantly improve if computer algorithms are used to assist the pathologist.

However, digital pathology may also have a few disadvantages. Currently, one of the disadvantages is that the focal plane is fixed. Digital scanners typically acquire only one image of the tissue. Adjustment of the focal plane is thereafter no longer possible. This can cause out-of-focus artifacts. However, it is also possible to acquire a plurality of different images, using different focal planes.

Besides this focusing problem, other artifacts, that commonly occur in pathology, also occur in digital pathologic images. Such artifacts may include:

Pressure effects.

Fixation artifacts (for example due to incorrect fixative used, contamination, or formation of acid formalin haematin pigment).

Inadequate dehydration (for example, water that remains trapped within the tissue).

Staining artifacts (for example due to an uncleaned water bath or uneven staining).

Objects that unintentionally appear in the image (for example, a microorganism or a hair).

Defocus artifacts.

Sensor noise.

A pathologist, by experience, is capable of recognizing such artifacts and ignoring them when interpreting an image. However, automatic image analysis programs may have difficulty processing an image containing one or more artifact(s).

Currently available digital analysis techniques perform normalization and nucleus detection for the complete tissue, or at least for a complete field of view.

US 2006/0014238 A1 discloses enhancing a digital image of a biological sample to which an immunohistochemical compound has been applied; removing predetermined types of unwanted cells in the enhanced digital image from consideration; identifying plural cells of interest in the enhanced digital image; identifying one or more areas of interest in the enhanced digital image; and removing cell artifacts from consideration in the one or more identified areas of interest, thereby automatically creating one or more enhanced areas of interest used for creating a medical diagnosis or prognosis.

M. Macenko, M. Niethammer, J. S. Marron, D. Borland, J. T. Woosley, X. Guan, C. Schmitt and N. E. Thomas, "A Method for Normalizing Histology Slides for Quantitative Analysis", in IEEE Int. Symposium on Biomedical Imaging, 2009, hereinafter: Macenko et al., discloses two mechanisms for overcoming inconsistencies in the staining process, thereby bringing slides that were processed or stored under different conditions into a common, normalized space to enable improved quantitative analysis. The paper discloses an algorithm that automatically finds the correct stain vectors for the image and then performs the color deconvolution.

In other kinds of image processing, problems may also occur when processing an image that contains undesirable regions.

SUMMARY OF THE INVENTION

It would be advantageous to have improved image processing. To better address this concern, a first aspect of the invention provides a system comprising a region detector comprising an artifact detector for detecting a region comprising an artifact in the image;

a parameter determining unit for determining a parameter, based on a portion of the image excluding the detected region; and an image processing module for processing the image, using the derived parameter.

The system has the advantage that the parameter is determined for a portion of the image excluding the detected region. Consequently, the parameter is not distorted by any undesirable or irrelevant properties of the detected region. After that, the image is processed using the derived parameter. Consequently, image processing is performed using a parameter that is not distorted by the properties of the detected region. This way, an improvement in the processing of the image is realized, because the parameter can be determined based on a relevant portion of the image.

Several local areas of images, such as digital pathology images, may contain artifacts and should be discarded for the analysis. Otherwise, normalization, and other image processing operations, may be sub-optimal. Consequently, it is beneficial to exclude the region or regions that contain artifacts when determining the parameter. The image can subsequently be processed using this parameter.

It is noted that in Macenko et al., pixels with substantially no stain are thresholded for stability reasons when a singular value decomposition is performed. However, such pixels having no stain are not artifacts, because some regions of a pathology sample may validly have little or no stain.

Digital image processing benefits from an explicit strategy to deal with irregularities in images. For the analysis of, for example, tissue with a computer (for example, nucleus detection, classification, normalization, etc.), it may be important to filter out the artifacts (for example, introduced by the sample preparation, or by the scanning procedure) to have a reliable result.

The system may comprise a display unit for displaying the processed image. Moreover, the display unit may be arranged for displaying an indication of the detected region comprising the artifact. This allows a user to see which region was excluded when the parameter was determined.

The system may comprise a user interface arranged for enabling a user to control display of the indication of the detected region by the display unit. Several options may be provided that allow obtaining a visualization that is suitable for a user. More kinds of visualization may be generated under control of the user to allow the user to compare the visualizations.

The user interface may be arranged for enabling the user to switch on or off the indication of the detected region. This helps to quickly check the location of the detected region if necessary, without disturbing the view when the indication of the detected region is not needed. This way, the user may view the processed image with and without the indication of the detected region. The user may thus control the system to display the processed image by itself, and also has the possibility to control the system to display the processed image with an indication of the region that was excluded when the parameter was determined. This allows for a flexible use of the system.

The user interface may be arranged for enabling the user to change the appearance of the indication of the detected region. This provides more flexibility and allows adjusting the indication according to the needs. For example, the user may be enabled to choose between any one or a combination of the following: choosing a color of the indication, displaying the outside border of the detected region, highlighting the detected region by filling it with a specific color or with a specific pattern, or indicating the region by means of a symbol such as an arrow.

The parameter determining unit may be arranged for determining a normalization parameter based on the portion of the image excluding the detected region. The image processing module may be arranged for performing a normalization of the image according to the normalization parameter. The whole image may thus be normalized using the parameter that was determined based on a portion of the image excluding the detected region. This allows determining the parameter with increased precision, while still applying the same normalization parameter to the whole image. The normalization parameter may be optimized for the portion of the image excluding the detected region, while still providing a uniform normalization.

The system may comprise a mask unit for generating a mask indicating the detected region. The parameter determining unit may be arranged for determining the parameter, based on the mask. In particular, the parameter determining unit may use the mask to define the excluded region. This is an efficient implementation possibility of the system.

The image may comprise a pathology image. Artifacts regularly occur in pathology. Consequently, the system may be advantageously applied to pathology images.

The image processing module may be arranged for processing also the detected region, using the derived parameter. This allows determining the parameter, based on the relevant portion of the image. At the same time, the image is processed in a consistent way by applying the same derived parameter to the detected region also.

The artifact detector may be arranged for detecting an artifact that comprises at least one of: an out-of-focus artifact, a staining artifact, a pressure artifact, and a fixation artifact. These are important examples of artifacts appearing in pathology images, which artifacts can be excluded by determining an image processing parameter for these images.

The artifact detector may be arranged for detecting an artifact by applying an object detection technique. For example, the artifacts may be known to have a particular appearance that can be detected using an object detection method. Such object detection methods are known to the person skilled in the art per se. Such object detection technique may be an efficient way to detect and/or delineate the region.

In another aspect, the invention provides a digital microscope comprising the system set forth. Such a digital microscope may further comprise a digital camera for acquiring the image, and a processor and a memory to implement the region detector, the parameter determining unit, and the image processing module. For example, the digital microscope is a digital pathology microscope.

In another aspect, the invention provides a workstation comprising the system set forth.

In yet another aspect, the invention provides a method of processing an image, comprising
detecting a region comprising an artifact in the image;
determining a parameter, based on a portion of the image excluding the detected region; and
processing the image using the derived parameter.

In another aspect, the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful.

It will be appreciated by those skilled in the art that the techniques disclosed herein may be applied to two-dimensional, three-dimensional, and/or higher-dimensional image data. Moreover, it will be appreciated that the techniques disclosed herein may be applied to image data obtained from photography, microscopy, computed tomography, x-ray, magnetic resonance, or any other kind of image acquisition modality. Moreover, it will be appreciated that the techniques described herein may be applied not only to pathology images and microscopy images, but also to other kinds of images including photography images and medical images.

Modifications and variations of the image acquisition apparatus, the workstation, the system, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter.

DETAILED DESCRIPTION OF EMBODIMENTS

Pathology images may be analyzed by hand. During manual analysis, sample processing artifacts and tissue artifacts are ignored by the pathologist, and by turning the focus-wheel on the microscope, the pathologist may keep the relevant portion of the image in focus. Recent trends indicate that pathology will be digitized in the near future. When using digital pathology, at least part of the analysis (e.g. nucleus detection, nucleus classification, HER2-scores, etc.) is done by means of a computer. However, known computer analysis may suffer from inaccurate results due to artifacts and out-of-focus areas.

Analysis results may be improved by first detecting the artifacts and out-of-focus areas locally, and then discarding these areas in the analysis. This does not only apply to pathology images, but also to other kinds of images, including medical images such as computed tomography images, X-ray images, magnetic resonance images, and other kinds of images. Examples of artifacts in medical images are implants and reconstruction artifacts. Other images, such as digital photographs, may also contain artifacts, such as compression artifacts, such as JPEG artifacts.

Figure 1:
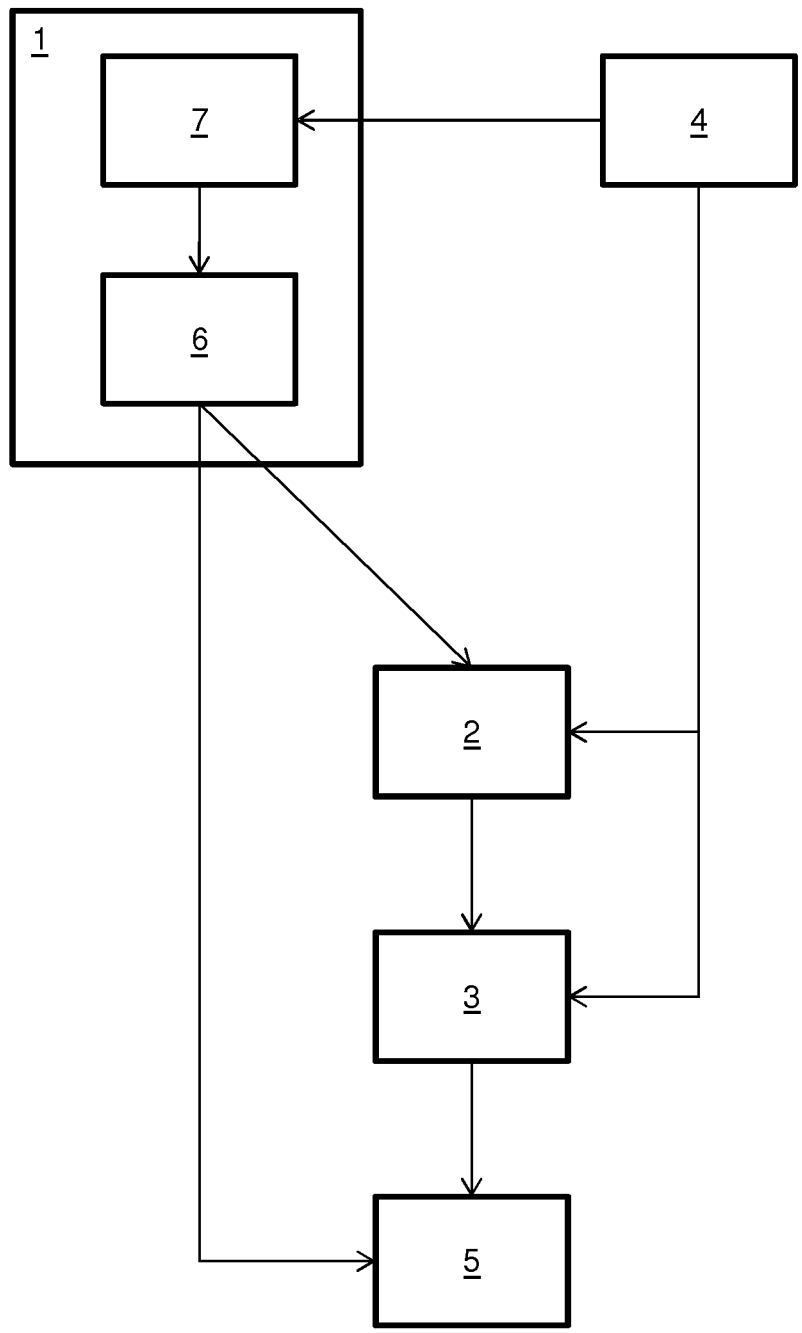
FIG. 1 is a block diagram of a system for processing an image.

FIG. 1 shows aspects of a system for processing an image. The system may be at least partly implemented by means of a suitably programmed computer or processor. Alternatively, dedicated electronic circuitry may be provided to implement any or all of the features of the system. The system may be implemented by means of a workstation. The system may also comprise user interface hardware, such as a keyboard, a mouse device, a display, and/or a touch sensitive display, in order to receive input from a user to control the system, for example to initiate a processing operation in respect of an image. Moreover, such user interface hardware may be used to display a result of the system, such as a processed image. The system may also comprise a communication port to communicate with other devices, such as an image acquisition apparatus, or a digital image repository.

The system may comprise an image receiver 4. This image receiver 4 may be operatively connected with the communication port. The image receiver 4 may be arranged for receiving one or more images from another device, for example a server comprising storage means for images. The image receiver 4 may also be arranged for communicating directly with the image acquisition apparatus (not shown). The image may comprise, for example, a histology image, or another kind of image, as described elsewhere in this description.

The system may comprise a region detector 1. The region detector 1 is arranged for detecting a region in the image that satisfies a particular criterion, more particularly, a region that comprises an artifact. Such an artifact may be an organic object, such as an insect or a microorganism or a hair. The artifact may also be an artificial object. The examples of artifacts mentioned in this paragraph may occur in pathology images. In pathology imaging, one is interested in the characteristics of the tissue sample. It may be difficult to observe these characteristics in the region of the image where the artifact is. However, the artifacts may also occur in other application domains.

Another kind of artifact is caused by the physical handling of the tissue. For example, if a portion of the tissue is subjected to pressure, that part of the tissue may be deformed, for example the cell structure may be destroyed. Another kind of artifact is caused by optical settings of the microscope, such as focus and/or diaphragm. Another kind of artifact is caused by digital pre-processing of images, such as digital image compression.

The system may comprise an artifact detector 7 for detecting an artifact in the image. The artifact detector 7 may be dedicated to detecting a particular kind of artifact. For example, an artifact detector 7 may be arranged for detecting a particular kind of insect, based on a shape model of the insect, and/or object recognition techniques. Such techniques are known in the art per se. The system may comprise a plurality of such artifact detectors 7, wherein each artifact detector 7 may be arranged for detecting a different kind of artifact. For example, different insects may be detected using different shape models. A hair may be detected using another shape model. Also, other kinds of objects may be modeled separately. Different artifact detectors may be implemented to detect the other kinds of artifacts, such as optical distortions and/or digital image processing anomalies. Such artifact detectors are known in the art per se. The region detector 1 generates a representation of the region that comprises the artifact or artifacts detected by the artifact detector 7.

The system may comprise a parameter determining unit 2 for determining a parameter, based on a portion of the image excluding the detected region. Such a parameter may be determined by analyzing the remaining portion of the image in a manner known in the art per se. The way to determine this parameter depends on the kind of image processing to be done. The parameter determining unit 2 may be operatively coupled to the region detector 1 to receive a representation of the region comprising the artifact from the region detector 1. Such a representation may be in the form of coordinates of a bounding box of the artifact. Other representations are also possible, such as a mask image.

The system may comprise an image processing module 3 for processing the image, using the derived parameter. For this purpose, use can be made of any desired, appropriate image processing operation. For example, a histogram equalization may be performed (using the histogram bins as the parameters), a normalization may be performed (using the maximum pixel value as the parameter), an object count may be performed using, for example, a threshold value to detect an object, wherein the threshold value is based on a histogram of the portion of the image excluding the detected portion. Other kinds of processing are within reach of the person skilled in the art, based on the present disclosure.

The system may comprise a display unit 5 for displaying the processed image. The display unit 5 may be used for displaying the raw (unprocessed) image, as well as for displaying the processed image. Moreover, the display unit 5 may be arranged for showing an indication of the detected region. For example, the detected region may be delineated by means of a contour around the region, or the detected region may be shown in a distinctive color. The detected region may be indicated in the unprocessed image and/or in the processed image. The display unit 5 may be implemented, for example, as a software unit that controls an external display device.

Moreover, the system may comprise a user interface 8. The user interface 8 may be arranged for enabling a user to control the system. In addition to many other applications, the user interface 8 may be arranged for enabling a user to control the display of the indication of the detected region by the display unit. The user interface may be configured so as to enable the user to visualize/display both the image and the artifacts that have been discarded during the processing of said image. For example, a button on a graphical user interface may be provided to enable the user to switch on or off the indication of the detected region. This way, the processed image and/or the unprocessed image may be displayed without any indication of the detected region. When the user chooses to press the button, the same image may be displayed with an indication of the detected region. Such an indication may be indicative of the position and/or the extent and/or the shape of the detected region. Moreover, the user interface 8 may be arranged for enabling the user to change the appearance of the indication of the detected region. For example, the user may be given a list of several options, enabling the user to choose between said options. For example, the user may choose between an outline of the detected region and a painting of the detected region with a color. Such a painted color may be fully opaque or semi-transparent. The color and/or opacity may be user-selectable. The user may further be enabled to select display of a symbol that indicates the position of the detected region. Such a symbol may include an arrow or a dot, or any other icon.

For example, the user interface comprises one or more user interface elements for the above-described purposes. Such a user interface element may comprise a widget of a graphical user interface. Another kind of user interface element, such as a hardware button, may also be used. The user may thus select whether (s)he wants to see the processed image with or without an indication of the detected region. Likewise, a user interface element may be provided that enables the user to visualize the original (unprocessed) image with or without the indication of the detected region. One type of image processing is normalization. Accordingly, the parameter determining unit 2 may be arranged for determining one or more parameters to be used for the normalization. Examples of parameters that can be used for normalization operations are average intensity, maximum intensity, or the bin values of a histogram. The image processing module 3 may be arranged for performing the normalization of the image according to the normalization parameter or parameters. For example, the intensity levels may be adjusted, by applying a correction factor, to change the average intensity or to bring the range of used intensities to a predetermined range. Histogram equalization is also possible.

The system may comprise a mask unit 6 for generating a mask indicating the detected region. Such a mask may be in the form of an image, for example a binary image, where a first pixel value is used for pixels that are part of the detected region, and a second pixel value, different from the first pixel value, is used for pixels that are not part of the detected region. The parameter determining unit 2 may be arranged for determining the parameter, based on the mask, for example by evaluating only those pixels of the unprocessed image that are not labeled as part of the detected region by the mask image.

The image processing module 3 may be arranged for processing also the detected region, using the derived parameter. So, although the value of the parameter was determined by the parameter determining unit 2, based on a portion of the image excluding the detected region, the processing module may perform the processing step, based on the derived parameter of the whole image, to obtain uniform handling of the image. Alternatively, the image processing module 3 may be arranged for applying the processing step only to the portion of the image excluding the detected region.

The artifact detector 7 may be arranged for detecting out-of-focus artifacts, staining artifacts, pressure artifacts, and fixation artifacts. Different artifact detectors 7 dedicated to detecting a particular kind of artifact may be used.

The artifact detector 7 may be arranged for detecting the artifact by applying an object detection technique. For example, shape models or template matching techniques can be used to detect an artifact that is known to have particular properties, such as a particular shape and/or color and/or texture.

The system may be incorporated in a digital microscope. Such a microscope may have an optical subsystem for enlarging a region of interest, and a digital camera for converting the light signals obtained from the optical subsystem into a digital image. The digital image may be fed to the image receiver 4 for handling by the system in the way set forth herein.

Alternatively, the system may be incorporated in a workstation. Such a workstation may receive images captured by a digital microscope.

The system is not limited to microscopy images. The system may also be optimized for other kinds of images.

Figure 2:
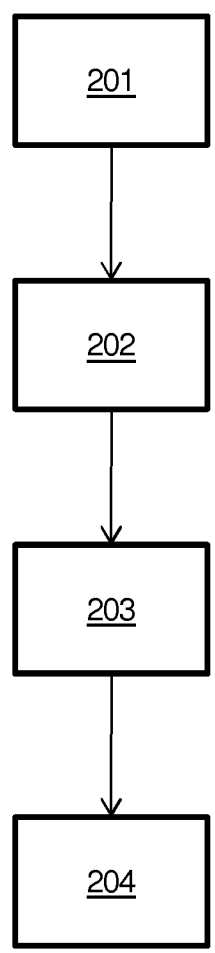
FIG. 2 is a flowchart of a method of processing an image.

FIG. 2 illustrates aspects of a method of processing an image. The method comprises step 201 of detecting a region in the image, based on a criterion. This criterion may be the presence of an artifact in the region. The extent of the region may correspond exactly to the extent of the detected artifact. Alternatively, the extent of the region may correspond to a convex hull of the artifact or a bounding box of the artifact. The region may include a margin around the artifact. These possibilities also apply to the region detected by the region detector 1. After detecting the region, the method proceeds to step 202 of determining a parameter, based on a portion of the image excluding the detected region. After determining the parameter, the method proceeds to step 203 of processing the image, using the derived parameter. After that, the method may proceed to step 204 of displaying the processed image on a display device. Alternatively or additionally, the image may be stored on a storage medium. The method may be included in a computer program product comprising instructions for causing a processor system to perform the method set forth.

The method may be modified and/or extended by the person skilled in the art in view of the description of the functionality of the system described herein.

Digitizing pathology has several advantages. First of all, it can increase the throughput. This becomes more and more relevant, since there is an increase in workload for the pathologists in the US, which can be ascribed, on the one hand, to the aging of the population and, on the other hand, to a small decrease in the number of pathologists that graduate each year in the US. Secondly, digital pathology provides a means to improve the quality of diagnosis. Studies have indicated that consistency in the diagnoses of pathologists can significantly improve if computer algorithms are used to assist the pathologist. However, digital pathology has also a few disadvantages. The main disadvantage is that the focal plane is fixed. Digital scanners typically provide only one image of the tissue. Adjustment of the focal plane is therefore no longer possible. However, it is possible to record a plurality of images with different focal planes.

Digital pathology does not only face artifacts introduced by the digital scanner itself. The following are examples of artifacts that can occur in any kind of pathologic images:

Pressure effects.

Fixation artifacts (such as incorrect fixative used, contamination and/or formation of acid formalin haematin pigment).

Inadequate dehydration (water that remains trapped within the tissue).

Staining artifacts (uncleaned water bath and uneven staining).

Ink artifacts, for example the ink used by a care provider to mark a surgical resection margin.

An overview of artifacts in traditional pathology is disclosed in E. McInnes, "Artifacts in histopathology" in Comp Clin Path (2005) 13: 100-108.

A pathologist is trained to routinely ignore the artifacts when interpreting pathology samples. However, digital pathology systems need an effective and explicit strategy.

For the analysis of tissue with a computer (i.e. nucleus detection, classification, normalization, etc.), it is important to filter out any artifacts (introduced by the sample preparation, as well as by the scanning procedure) to improve the reliability and/or reproducibility of the result.

As examples of a possible artifact, forceps injury to lung at necropsy may be caused by the fresh tissue being excessively squeezed by the forceps in the prosector's hand before fixation. Acid formalin haematin pigment is a dark brown, anisotropic, microcrystalline, iron-negative pigment produced by the reaction of formic acid from unbuffered formalin with the haem of haemoglobin at an acid pH. Pale-staining areas in white matter of the spinal cord may occur because water may remain trapped within the tissue due to inadequate dehydration, resulting in tissue that is partially unstained. An uncleaned water bath may also contain remnants of previous tissues, which may become incorporated into the present tissue section, such as liver tissue present in the lung. Eosin flakes seen above the focal plane of the tissue section may be caused by precipitated dye derived from an unfiltered stock solution.

Normalization and nucleus detection may be done for the tissue as a whole, or at least for a complete field of view. However, as indicated in the examples above, several local areas are not reliable, or not relevant for the analysis, and should be discarded for the analysis. Otherwise, normalization may be sub-optimal, and results of automated analysis, such as automatic nucleus detection and/or automatic nucleus count may indicate many false positives and/or false negatives. In current practice, standard image normalization techniques include histogram equalization.

It is possible to determine locally where the artifacts (like out-of-focus and staining artifacts) are. Such artifacts may be discarded during the analysis of the image. The discarded artifacts may be indicated during a visualization of the results of the analysis.

Several types of artifacts can appear in digitized images of tissue. Y. Sun, S. Duthaler and B. J. Nelson, "Autofocusing Algorithm Selection in Computer Microscopy", in Intelligent Robots and Systems, 2005, discloses techniques to detect in-focus as well as out-of-focus artifacts. Derivative approaches, like sum of (modified) Laplace, or energy Laplace, or statistics-based Algorithms, like variance and auto-correlation techniques, may be used. Related methods may be able to detect staining artifacts, because they may appear as unsharp spots of staining liquid. Fixation and pressure artifacts may also be detected.

After the artifacts have been detected, an analysis may be performed by using a binary mask, indicating which pixels should be used for the analysis and/or which pixels should not be used for the analysis. Visualization of the region containing the artifacts can be done by for example shading the relevant area in the image.

Prior to image normalization, it may be first determined locally where the artifacts (such as out-of-focus and staining artifacts) are. The artifacts found may be discarded during the establishment of a normalization parameter. Normalization may be applied only to the region excluding the artifacts. Alternatively, normalization may be applied to the whole image, using the normalization parameter that was determined based on the region of the image excluding the artifacts. Alternatively, the detected artifacts may be combined with the rest of the image, for example by applying a fading technique or a gradual change of the normalization parameter within the excluded region, to avoid sudden changes of the normalization parameter at the border between the excluded region and the rest of the image.

Figure 3:
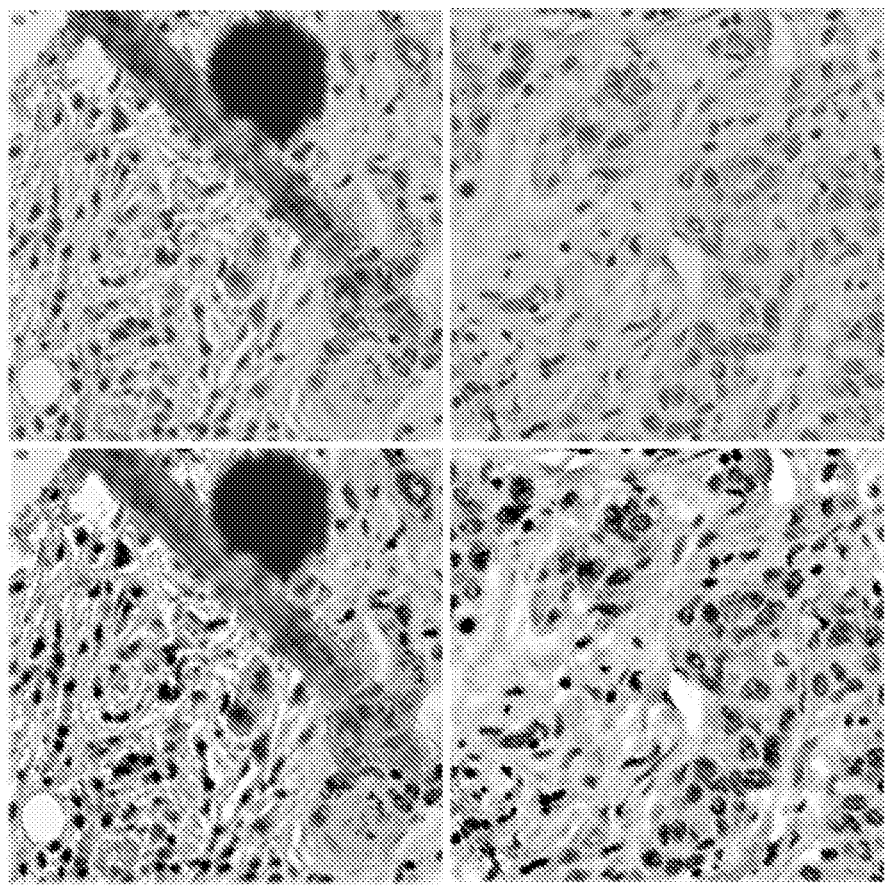
FIG. 3 shows four examples of pathology images.
Figure 4:
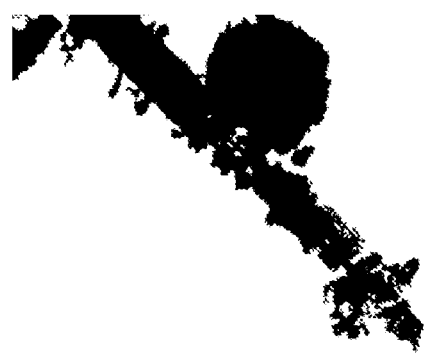
FIG. 4 shows a mask corresponding to a region comprising an artifact.

FIG. 3 illustrates two immunohistochemistry (IHC) stained images from the same coupes. IHC is a known technique that may be used for analyzing cells of a tissue section. The top left image shows a first image as acquired using the digital pathology scanner. The top right image shows a second image as acquired using the digital pathology scanner. The bottom left image shows the first image after normalization. The bottom right image shows the second image after normalization. FIG. 4 shows a mask image for the first image. The black region in FIG. 4 corresponds to a region in the first image in which an artifact was detected in the image as acquired from the digital pathology scanner. The normalization parameter for the first image was determined based on the first image as acquired with the digital pathology scanner, but excluding the masked region according to the mask image shown in FIG. 4. The image was normalized using the resulting normalization parameter, and the result is the bottom left image shown in FIG. 3.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for processing an image, comprising
   a region detector comprising an artifact detector for detecting a region comprising an artifact in the image;
   a parameter determining unit for determining a parameter, based on a portion of the image excluding the detected region, wherein the parameter determining unit is operatively coupled to the region detector to receive a representation of the region comprising the artifact;
   an image processing module for processing the image, using the derived parameter; and
   a user interface to enable a user to visualize both the image and the artifact excluded during the processing of the image.

2. The system according to claim 1, further comprising a display unit for displaying the processed image with an indication of the detected region.

3. The system according to claim 2, wherein the user interface enables a user to control the display of the indication of the detected region by the display unit.

4. The system according to claim 3, wherein the user interface is arranged for enabling the user to switch on or off the indication of the detected region.

5. The system according to claim 3, wherein the user interface is arranged for enabling the user to change the appearance of the indication of the detected region.

6. The system according to claim 1, wherein
   the parameter determined by the parameter determining unit comprises a normalization parameter; and
   the image processing module is arranged for performing a normalization of the image according to the normalization parameter.

7. The system according to claim 1, further comprising a mask unit for generating a mask indicating the detected region, wherein the parameter determining unit is arranged for determining the parameter, based on the mask.

8. The system according to claim 1, wherein the image comprises a pathology image.

9. The system according to claim 1, wherein the image processing module is arranged for processing also the detected region, using the derived parameter.

10. The system according to claim 1, wherein the artifact detector is arranged for detecting at least one of: an out-of-focus artifact, a staining artifact, a pressure artifact, and a fixation artifact.

11. The system according to claim 1, wherein the artifact detector is arranged for detecting the artifact by applying an object detection technique.

12. A digital microscope comprising a system according to claim 1.

13. A workstation comprising a system according to claim 1.

14. A non-transitory computer-readable storage medium comprising instructions for causing a processor system to perform a method of processing an image, comprising
   detecting a region comprising an artifact in the image;
   sending region data to a parameter determining unit;
   determining a parameter, based on a portion of the image excluding the detected region;
   processing the image, using the derived parameter; and
   visualizing both the image and the artifact excluded during the processing of the image.

* * * * *